United States Patent [19]

Dufresne et al.

[11] Patent Number: 5,397,756
[45] Date of Patent: Mar. 14, 1995

[54] PROCESS FOR THE PRESULPHURIZATION OF HYDROCARBON TREATMENT CATALYSTS

[75] Inventors: Pierre Dufresne, Valence; Bernard Legall, La Voulte sur Rhone; Georges Berrebi, Bourg les Valences, all of France

[73] Assignee: Europeenne de Retraitement de Catalyseurs (EURECAT), La Voulte Sur Rhone, France

[21] Appl. No.: 41,380

[22] Filed: Apr. 1, 1993

[30] Foreign Application Priority Data

Apr. 1, 1992 [FR] France ................ 92 04051

[51] Int. Cl.$^6$ ............... B01J 37/20; B01J 27/043; B01J 27/049; B01J 23/92
[52] U.S. Cl. ............................. 502/33; 502/28; 502/30; 502/31; 502/219; 502/220; 502/221; 502/222; 502/223; 502/168
[58] Field of Search ................ 502/28, 30, 31, 33, 502/220, 221, 219, 168

[56] References Cited

U.S. PATENT DOCUMENTS

| | | | |
|---|---|---|---|
| 4,548,920 | 10/1985 | Thompson et al. | 502/219 |
| 4,983,558 | 6/1991 | Born et al. | 502/31 |
| 5,139,983 | 8/1992 | Berrebi et al. | 502/22 |
| 5,215,954 | 6/1993 | Seamans et al. | 502/220 |

FOREIGN PATENT DOCUMENTS

| | | |
|---|---|---|
| 0064429 | 11/1982 | European Pat. Off. . |
| 0447221 | 9/1991 | European Pat. Off. . |
| 0448435 | 9/1991 | European Pat. Off. . |
| 0466568 | 1/1992 | European Pat. Off. . |
| WO88/08749 | 11/1988 | WIPO . |

*Primary Examiner*—Paul E. Konopka
*Attorney, Agent, or Firm*—Millen, White, Zelano, & Branigan

[57] ABSTRACT

For the impregnation into the pores of a hydrocarbon treatment catalyst of a sulfurizing agent chosen from element sulfur and organic polysulfides with the aid of a solvent, the impregnation process totally or partially comprises a constituent of the olefin or olefin fraction type, e.g., of the vegetable oil type, or a similar constituent. The use of such a constituent makes it possible to significantly reduce the exothermal effect which occurs during presulfurization, compared with the exothermal effects obtained without using such a constituent.

13 Claims, 2 Drawing Sheets

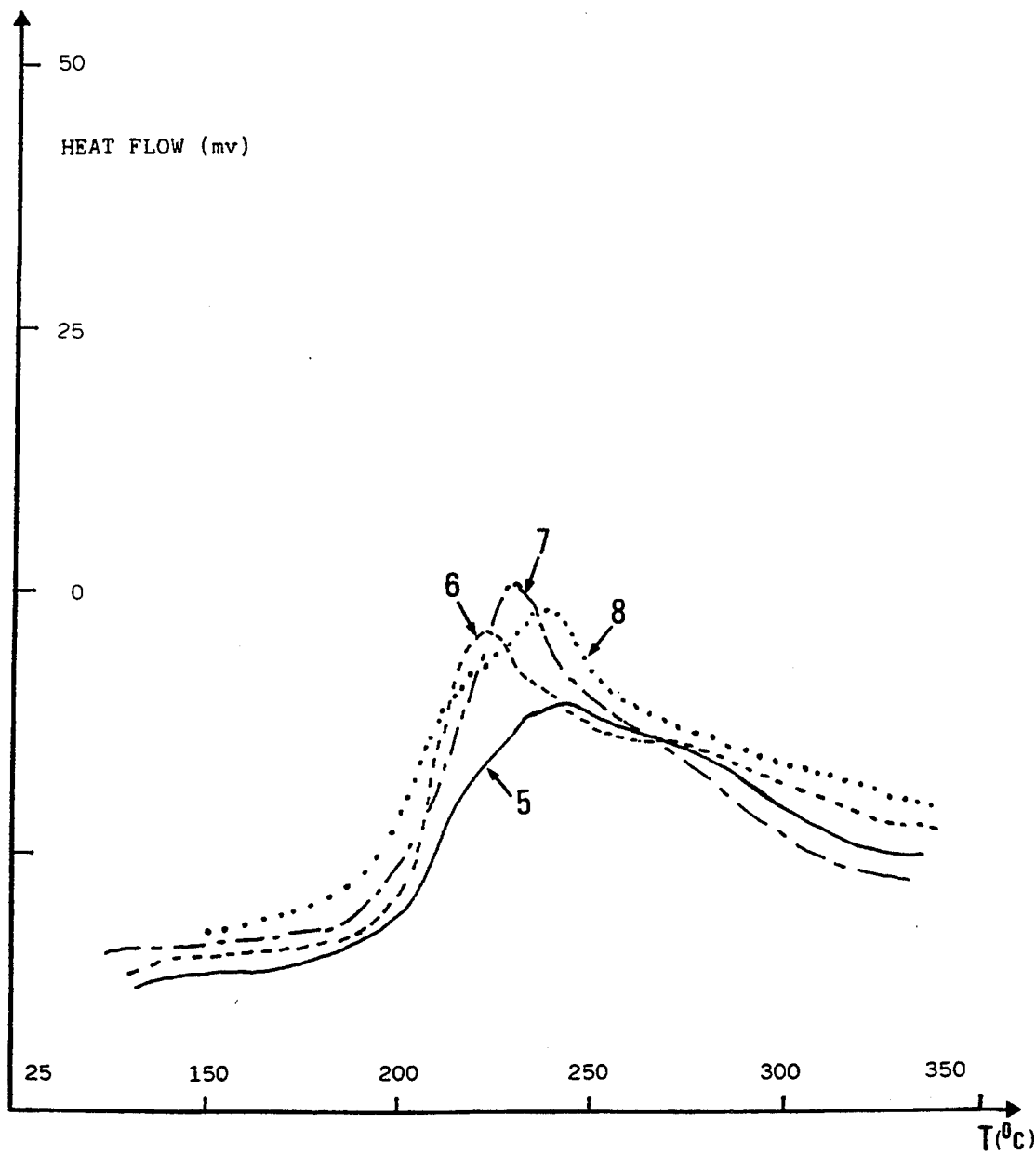

PROCESS FOR THE PRESULPHURIZATION OF HYDROCARBON TREATMENT CATALYSTS

BACKGROUND OF THE INVENTION

The present invention relates to a process for the presulphurization of a hydrocarbon treatment catalyst and/or preconditioning a catalyst which is then sulphurized.

It is often desirable to carry out a sulphurization (generally called presulphurization) of metals occurring in the composition of certain hydrocarbon refining and/or hydroconversion catalysts, either when these catalysts are new, or following regeneration of said catalysts prior to the reuse thereof.

Therefore a presulphurization of new or regenerated catalysts is desirable for the use of said catalysts in refining reactions, e.g. hydrodesulphurization reactions of various petroleum fractions, e.g. gas oils, whose sulphur content should be lowered before use in order to make them comply with specifications. Such desulphurization reactions are generally performed in the presence of hydrogen, the charge being e.g. an atmospheric gas oil generally distilling between 230° and 350° C. and which can have a sulphur content between 0.12 and 1.5% by weight. In this case, the catalyst used for the hydrodesulphurization contains a generally non-acid support, e.g. an alumina or alumina mixtures (U.S. Pat. No. 4,334,982) or any other adequate support based on at least one oxide of a metal or metalloid e.g. magnesia (U.S. Pat. No. 4,132,632/U.S. Pat. No. 4,140,626), silica, silica-alumina, silica-magnesia, fluorinated alumina or silica, alumina-boron, clay, charcoal. The said support mixture or mixtures can at least partly be in amorphous or crystalline form (zeolite) and the catalyst also contains 0.2 to 30% of at least one active metal from groups VI, VIII, etc., e.g. chosen from cobalt, molybdenum, nickel and tungsten (U.S. Pat. No. 3,732,155 and U.S. Pat. No. 3,804,748). Generally use is made of a pair of these metals, e.g. cobalt-molybdenum, nickel-molybdenum or nickel-tungsten. It is possible to use a precious metal from group VIII from the platinum group: Pt, Pd, etc., (U.S. Pat. No. 4,098,682).

Thus, prior to using the new or regenerated catalyst, in the prior art it undergoes a sulphurization (presulphurization) in a hydrodesulphurization reactor. This sulphurization makes it possible to include in the catalyst e.g. approximately 50 to 150% of the stoichiometric quantities of sulphur calculated on the sulphide quantities of formula (according to the metals present): $Co_9S_8$, $MoS_2$, $WS_2$, $Ni_3S_2$.

This sulphurization or presulphurization is carried out in the prior art at a final temperature generally between 250° and 400° C. by a hydrogen sulphide mixture generally diluted in hydrogen (hydrogen sulphide proportion in the hydrogen approximately 0.5 to 5 volume %) with an adequate space velocity of e.g. approximately 1000 to 3000 liters of gas under normal temperature and pressure conditions per liter of catalyst and per hour (U.S. Pat. No. 4,334,982). The actual sulphurization or presulphurization can be carried out in temperature ranges (FR-B-2,476,118). It is possible to use various sulphurizing agents, other than hydrogen sulphide ($H_2S$) and e.g. a sulphur compound from the mercaptan group, carbon sulphide ($CS_2$), sulphides, disulphides or polysulphides, thiophene compounds and preferably dimethyl sulphide (DMS) and dimethyl disulphide (DMDS).

However, catalyst regeneration is ever more frequently taking place on the premises of catalyst regenerating specialists sometimes remote from the industrial unit. The refiner requires a product which is ready to use and this is made possible by the effective process of EP-B-130,850 of the present Applicant, in which a sulphur compound is incorporated into the catalytic material and said compound causes the sulphurization or presulphurization of the catalyst when, subsequently, in the reaction zone (charge treatment zone) or in the immediate vicinity thereof, the catalyst will be contacted with the hydrogen. Obviously, the incorporation of said sulphur compound can, if desired, be carried out in the vicinity of the industrial unit or even at the catalyst treatment location. The incorporation process for said sulphur compound can be performed ex situ, also on a new or regenerated catalyst, prior to the use thereof in an industrial unit.

More specifically, in EP-B-130,850, the catalyst sulphurization process is characterized by a preliminary stage of incorporation into the catalytic material of a sulphur compound of a special nature. The preliminary stage of introducing a sulphur compound, which is referred to in arbitrary manner as ex situ pretreatment, no matter whether it is performed in the vicinity of the industrial unit or at a varying geographical distance therefrom (where the catalyst has been regenerated or produced) does not take place in or in the immediate vicinity of the reactor (called in arbitrary manner in situ), i.e. in areas making it necessary to operate under temperature, pressure or other conditions at least partly imposed by the operating conditions of the actual reactors.

Thus, EP-B-130,850 relates to a process making it possible to incorporate, in the absence of hydrogen, at least one sulphurizing agent of general formula $R-S_{(n)}-R'$, in which R, R' and n are defined hereinafter, into the pores of the new or regenerated catalyst. The sulphurization of the catalyst can thus be carried out in the following way. In a first stage performed ex situ and in the absence of hydrogen, the catalyst is treated with the aid of at least one sulphurizing agent so as to partly or totally incorporate said agent into the catalyst pores, the sulphurizing agent being a polysulphide of general formula $R-S_{(n)}-R'$, said sulphurizing agent being used in solution in a solvent. In a second stage, performed in situ and preferably at above 150° C., the catalyst is activated in the presence of hydrogen, the requisite sulphur quantity being fixed as a result of the presence of hydrogen on the metal or metals entering into the composition of said catalyst. This latter stage is improved in EP-G-181,254. The object of these two patents is therefore to carry out ex situ the presulphurization of the catalysts by incorporating the necessary sulphur quantity and only that sulphur quantity which is required by the user. Therefore the catalysts are supplied to the refinery or any other unit preconditioned for sulphurization.

The refiner or any other user consequently only has to reactivate this catalyst in the presence of hydrogen and at a temperature of e.g. 100° to 400° C. for a desulphurization catalyst in order to react the sulphur on the metals contained and immediately start the hydrocarbon refining or conversion reaction by the injection of the charge to be treated.

In the polysulphide of formula R—S$_{(n)}$—R', n is an integer from 3 to 20, preferably 3 to 8 and more particularly 5 to 7, R and R', which are the same or different, represent organic radicals, each containing 1 to 150, preferably 2 to 60 and more particularly 4 to 13 carbon atoms per molecule, said radicals being chosen from within the group constituted by alkyl radicals, i.e. saturated or unsaturated, straight or branched or of the naphthene type, aryl radicals, alkyl aryl radicals and aryl alkyl radicals, whereby said radicals can have at least one heteroatom and R' can optionally be a hydrogen atom.

Reference is made as a preferred example of a polysulphide to ditert. dodecyl polysulphide (n=5), in which R and R' are in each case a tert. dodecyl radical. This product is e.g. marketed by ATOCHEM under the reference TPS 32, because it contains approximately 32% by weight sulphur. Reference can also be made to ditert. nonyl polysulphide (n=5), in which R and R' are in each case a tert. nonyl radical. This product is marketed by ATOCHEM under the reference TPS 37 or TNPS, because it contains approximately 37% by weight sulphur.

The sulphurizing agent is used diluted in an adequate solvent and incorporated into the catalyst generally by an impregnation method. The sulphurization processes vary as a function of the fractions to be subsequently treated in the presence of the catalysts treated according to the invention. The chosen solvent can thus be one of the following solvents used singly or in mixed form:

- a light petrol e.g. boiling at between approximately 60° and 95° C.,
- a hexane-type petrol boiling at approximately 63° to 68° C.,
- a F-type petrol boiling at approximately 100° to 160° C. and generally containing 10 to 20% and e.g. 15 volume % of aromatic hydrocarbons,
- a white spirit-type petrol boiling at between approximately 150° and 250° C. and generally containing 14 to 22 and e.g. 17 volume % aromatic hydrocarbons,
- any hydrocarbon or non-hydrocarbon fraction, equivalent to the above petrols,
- or any other appropriate organic solvent.

It has subsequently been discovered (EP-A-400,581) that the qualities of the methods described in EP-B-130,850 and EP-B-181,254 of the Applicant are further improved if the organic polysulphide is used mixed in critical quantities with elemental sulphur instead of being used alone. (The use of elemental sulphur alone for the presulphurization of catalysts is described in U.S. Pat. No. 4,177,136). The simultaneous use of elemental sulphur brings about a synergism in the ex situ presulphurization, when said elemental sulphur is mixed with an organic polysulphide. The elemental sulphur is e.g. used in the form of melted sulphur, powder sulphur, flowers of sulphur, according to any appropriate method, e.g. that described in EP-B-153,233 of the present Applicant.

SUMMARY OF THE INVENTION

In the present invention, the presulphurization of the catalyst takes place either in the presence of at least one organic polysulphide, or in the presence of elementary sulphur, or with the aid of both an organic polysulphide and elemental sulphur. Preferably, use is made of a mixture of at least one organic polysulphide and elemental sulphur. The solvent used is generally and preferably a white spirit or an equivalent solvent.

When use is made of both an organic polysulphide and elemental sulphur, the sulphur weight content (introduced on the catalyst or incorporated into the catalytic material) coming from the polysulphide represents 5 to 75%, based on the elemental sulphur-polysulphide mixture, but preferably represents 20 to 60% and more particularly 25 to 50% of the total sulphur content. The sulphurizing agent contains approximately a mixture of elemental sulphur and organic polysulphides such that approximately 5 to 75% of the total sulphur of the mixture belong to the organic polysulphide (expressed in grams of sulphur). In earlier methods, during the catalyst starting stage in the refinery unit, sometimes significant exothermic effects were noted, which can be reduced by the present procedure. The existence of exothermic reactions in the reactor is eliminated or reduced by working according to the present invention, which consists of using as the solvent not a white spirit used singly, but an adequate mixture of a white spirit or equivalent solvent and at least one compound or constituent containing olefin-type carbon bonds and e.g. more particularly of the triglyceride type.

The said mixture or solvent mixture contains by weight 0.1 to 99% white spirit or equivalent solvent and 99.9 to 0.1% of the olefin-type constituent or compound and preferably 2 to 98% of a white spirit or equivalent solvent and 2 to 98% of at least one olefin-type constituent or compound. This constituent can be a hydrocarbon or a random hydrocarbon fraction able to contain double bonds. This can be in the form of olefins (monoolefins, diolefins or polyolefins) or petroleum fractions liable to contain olefins, such as the fractions obtained from certain petroleum refining processes such as in particular viscoreduction, coking or steam cracking. This constituent can also be a triglyceride of unsaturated fatty acids, such as vegetable oils. Preferably, the solvent contains 4 to 85 and more particularly 6 to 60% by weight of said constituent or compound.

The said constituent or compound must preferably have a boiling point exceeding approximately 200 and preferably exceeding 300° C. Thus, it remains in preponderant form in the catalytic material, when the latter is treated in a furnace with a view to eliminating most of the white spirit or equivalent solvent, if such a solvent was used together with said constituent.

The invention is therefore characterized in that the catalyst is contacted with the elementary sulphur and a liquid incorporating a sulphurizing agent from within the group of organic polysulphides, a solvent of the white spirit type or a similar solvent, and an olefin-type compound, then the mixture undergoes a thermal treatment for on the one hand eliminating the solvent and on the other bringing about a combination reaction between the elementary sulphur and the double bonds of the olefinic compound. The heat treatment takes place at a temperature exceeding 100° and preferably exceeding 120° C. The elementary sulphur is thus partly or completely combined in the form of a polysulphide. This reaction is identical to that known from a completely different technical field, namely the tire industry, where it is called a vulcanization operation. The latter, used for improving the mechanical properties of natural rubber, takes place by adding elemental sulphur to the natural rubber, followed by the heat treatment. The sulphur reacts with the double bonds of the rubber, which is a polyisoprene, in order to form monosulphide or polysulphide bridges between the carbon chains.

The invention permits the in situ creation of a polysulphide by recreating conditions favorable for said chemical reaction of combining elemental sulphur with an olefin-type compound. This insertion of sulphur atoms between the chains of the olefin compounds is illustrated by the following drawing:

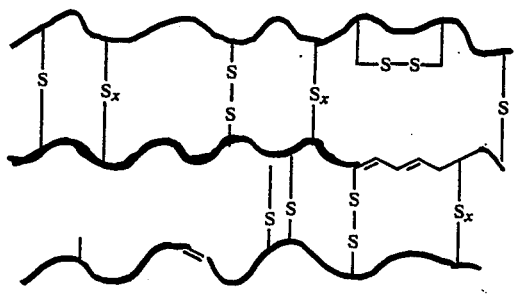

According to an aspect of the invention, the chemical combination of the olefin fraction and the elementary sulphur can take place prior to the incorporation of the mixture in the catalyst.

The said compound, used singly or mixed with a hydrocarbon solvent such as white spirit, can be chosen from vegetable oils, more particularly the family of fatty acid triglycerides. Among the oils, more particular reference is made to these derived from unsaturated fatty acids such as ethylene acids, e.g. myristoleic, palmitoleic, oleic, elaidic (geometrical isomer of oleic acid), gadoleic, erucic acids, or polyethylene acids (polyethylene acids of oils, e.g. linoleic or linolenic acid), whereby said oils can also contain saturated fatty acids such as e.g. butyric, capproic, caprylic, capric, lauric, myristic, palmitic, stearic and arachidic acids.

Thus, the constituent used in the formulation of the mixture (mixture-solvent) can be based on a fatty acid ester, said acids containing 6 to 24 carbon atoms and one, two or three olefin-type bonds, or is based on colza, peanut, soybean, corn, sunflower, safflower, palm or linseed oils or animal fats such as suet or lard.

As indicated hereinbefore, the preferred oils are colza, peanut, soybean, corn, sunflower, safflower, palm and linseed oils. Animal fats such as suet or lard can also be suitable, bearing in mind their significant unsaturated fatty acid content.

The triglycerides used have the general formula:

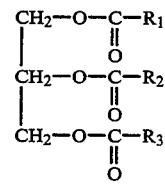

in which $R_1$, $R_2$, $R_3$, which are the same or different, are alkyl radicals, each of which can have up to 24 carbon atoms and in majority manner up to 17 and which have aliphatic or ethylene bonds.

For example, the following formula

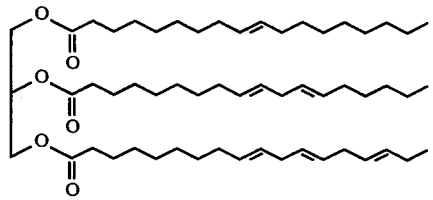

represents both three triglycerides of oleic, linoleic and linolenic acids, i.e. here having 18 carbon atoms and respectively 1, 2 or 3 double bonds.

BRIEF DESCRIPTION OF THE DRAWINGS

FIGS. 1 and 2 are differential thermal analysis curves obtained on a SETARUM-type thermobalance

TABLE 1

Figure 1:
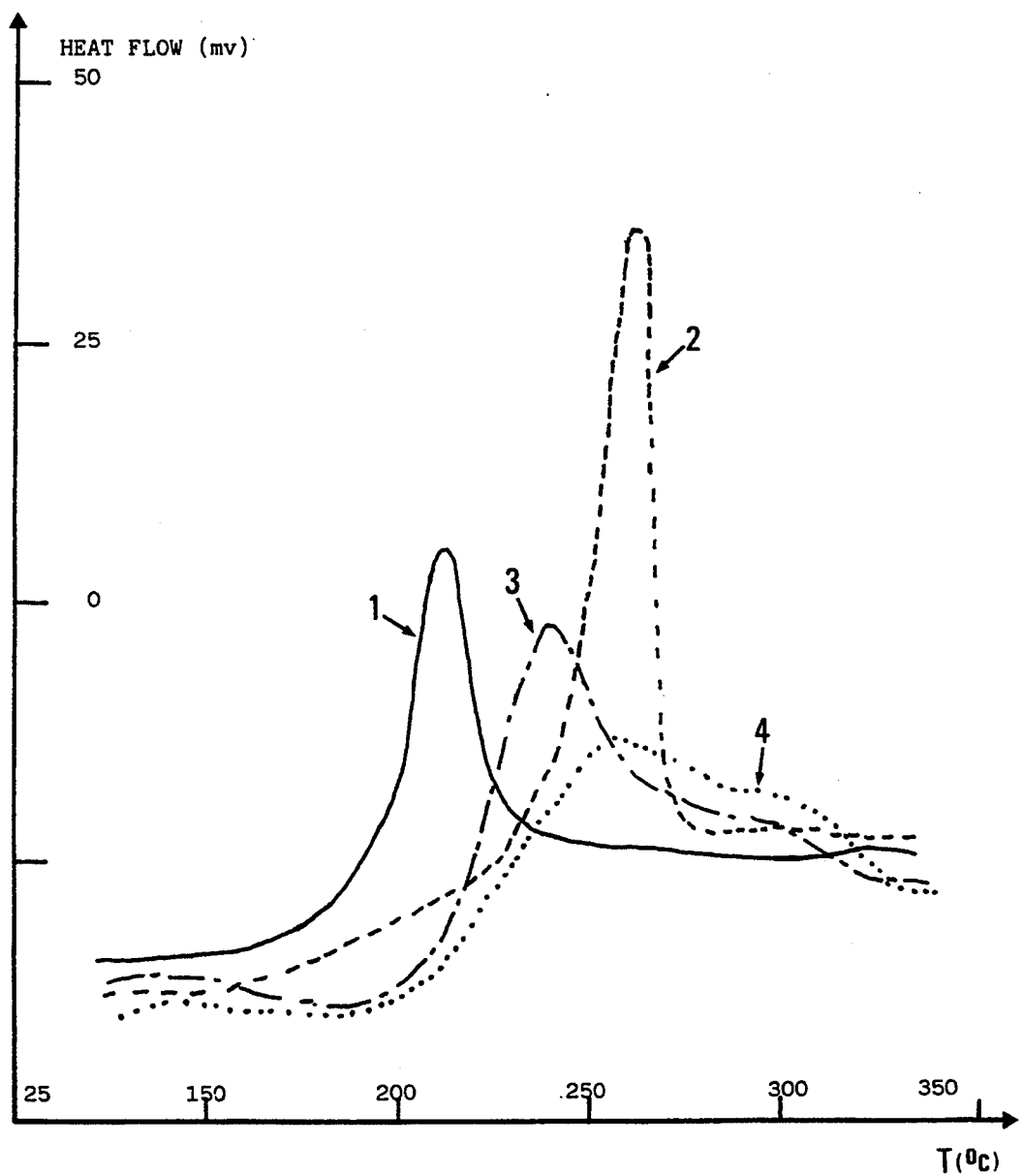

| | Summary table of presulphurization tests performed on 200 g of catalysts of the CoMo type. | | | | | | | |
|---|---|---|---|---|---|---|---|---|
| Example No. | 1 | 2 | 3 | 4 | 5 | 6 | 7 | 8 |
| According to invention | no | no | yes | yes | yes | yes | yes | yes |
| TPS | TPS 37 44.3 g | 0 | 0 | TPS 37 22.2 g | TPS 32 25.6 g | 0 | 0 | 0 |
| Elemental sulphur | 0 | 16.5 g | 16.5 g | 8.2 g | 8.2 g | 16.5 g | 16.5 g | 16.5 g |
| White spirit | 53 ml | 98 ml | 75 ml | 56 ml | 53 ml | 45 ml | / | / |
| Olefin fraction | 0 | 0 | colza oil 20 ml | colza oil 20 ml | soybean oil 20 ml | pyrolysis petrol 50 ml | coking petrol, delayed 95 ml | ALDRICH 1-tetradecene (alpha-olefin) |
| Color | black | light grey | dark grey | black | black | dark grey | dark grey | dark grey |
| DOC 0.2 ml/g | 7.2 | 6.3 | 6.4 | 7.4 | 7.5 | 6.1 | 7.2 | 7.1 |
| C (wt. %) | 6.2 | 0.3 | 7.1 | 10.3 | 10.7 | 17.2 | 13.8 | 14.1 |
| S (wt. %) | 7.5 | 8.1 | 7.0 | 6.9 | 7.1 | 6.6 | 6.9 | 7.0 |
| Exothermic | curve 1 | curve 2 | curve 3 | curve 4 | curve 5 | curve 6 | curve 7 | curve 8 |

EXAMPLES

The characteristics of the invention are illustrated in the following examples.

The presulphurization tests are performed on a hydrotreatment catalyst for petroleum fractions containing a mixture of cobalt and molybdenum oxides on an alumina support. The catalyst has the following characteristics:
cobalt content: 3% by weight,
molybdenum content: 9% by weight,
specific surface: 230 m/g,
total pore volume: 0.52 ml/g.

In the following examples, said solid undergoes various presulphurization tests, which are summarized in table 1.

EXAMPLE 1

Comparative Example

The solid is impregnated by a solution of a mixture of ditert. nonyl polysulphide dissolved in white spirit. 200 g of catalyst are placed in a rotary coating pan. 44.3 g of ditert. nonyl polysulphide (obtained from ATOCHEM under mark TPS 37, sulphur content 37% by weight) are mixed with 53ml of white spirit with initial and final boiling points of respectively 140° and 180° C. This clear solution is impregnated to dryness on the catalyst for 10 minutes. The solid is then placed in a Soxhlet evaporator, where the flask is immersed in an oil bath heated to 125° C. To it is applied an initial vacuum (pressure 5 kPa) for 1 hour, in such a way that the solvent evaporates. The resultant solid is black and contains 6.2% C and 7.5% S (by weight). The thus prepared solid, as a result of the addition of sulphur and the heat treatment, contains a mixture of molybdenum and cobalt oxysulphides.

The active form of the catalyst for the hydrotreatment of petroleum fractions is an intimate mixture of cobalt and molybdenum sulphides. This transformation takes place subsequently hot and under hydrogen. Thus, the solid is placed in a tubular reactor, is exposed to a hydrogen flow of 0.1 liter hour$^{-1}$ gram$^{-1}$ and heated to 320° C. This is followed by the application of Dynamic Oxygen Chimisorption (DOC), which makes it possible to measure the oxygen quantity adsorbed cold on the sulphur catalyst. This procedure permits a good evaluation of the catalytic activity of catalysts based on sulphides in the hydrotreatment of petroleum charges. In this case, the chimisorbed oxygen quantity is 7.2 ml per gramme of catalyst.

The heat flow under hydrogen is evaluated by differential thermal analysis, the curves being given in FIGS. 1 and 2.

EXAMPLE 2

Comparative

The catalyst used in Example 1 is presulphurized by impregnating with 98 ml of white spirit. The white spirit is then evaporated under the conditions of Example 1. 200 g of catalyst are then intimately mixed with 16.5 g of elemental sulphur. The treatment of the catalyst then takes place as in Example 1. The C and S percentages and the chimisorbed oxygen quantity are given in Table 1.

EXAMPLE 3

According to the Invention

The procedure of Example 2 is used, but in this case the solvent with which the catalyst is impregnated contains 75 ml of white spirit and 20 ml of colza oil. The white spirit is then evaporated according to the conditions of Example 1. During this evaporation, most of the colza oil remains impregnated in the catalytic material. The results are given in table 1.

EXAMPLE 4

According to the Invention

The procedure of Example 1 is used, using on the one hand 22.2 g of TPS 37 (instead of 44.3 g) and 8.2 g of elemental sulphur. This sulphur is mechanically dispersed by vigorous stirring in the mixture of 22.2 g of TPS 37, 57 ml of white spirit and 20 ml of colza oil. The results obtained are given in table 1.

EXAMPLE 5

According to the Invention

Example 4 is repeated replacing the TPS 37 by TPS 32 and replacing 20 ml of colza by 20 ml of soybean oil.

EXAMPLE 6

According to the Invention

The procedure of Example 3 is used, but in this case the solvent is a mixture of 45 ml of white spirit and 50 ml of pyrolysis petrol (or steam cracking), which has the composition of 13% paraffins, 50% aromatics, 12% olefins and 25% aromatic alkenyl and diolefins.

EXAMPLE 7

According to the Invention

The procedure of Example 2 is used with the following variants. The solvent is constituted by 95 ml of a delayed coking petrol containing 51% paraffins, 10% aromatics, 35% olefins and 4% aromatic alkenyl and diolefins in place of 98 ml of white spirit. After treating the catalyst under the conditions necessary for evaporating the white spirit (although this solvent is absent here), the catalyst is mixed with 16.5 g of elemental sulphur. The results are given in table 1.

EXAMPLE 8

According to the Invention

The procedure of Example 7 is used, but the delayed coking petrol is replaced by 1-tetradecene. The results are given in table 1.

FIGS. 1 and 2 are differential thermal analysis curves obtained on a SETARAM-type thermobalance. These curves show for each example (curves 1 to 8 respectively corresponding to Examples 1 to 8), the variation of the heat flow in the presence of hydrogen as a function of the temperature. Examples 1 and 2, not according to the invention, show significant exothermic effects, which do not occur with the same intensity in the examples according to the invention.

EXAMPLE 9

Example 4 is repeated successively using in place of colza oil, soybean, peanut, olive, oleaginous, palmitic and oleic oils. Substantially the same results are obtained, but preference is given firstly to colza oil and then soybean oil.

We claim:
1. In a process for the treatment of a new or regenerated hydrocarbon refining or conversion catalyst containing a support, comprising at least one oxide of a metal or a metalloid, and at least one active metal, said treatment being performed in the absence of hydrogen, comprising incorporating in the pores of said catalyst at least one sulphurizing agent which is elemental sulphur or an organic polysulfide of formula $R-S_{(n)}-R'$, in which n is an integer from 3 to 20 and in which R and R', which are the same or different, represent an organic radical containing 1 to 150 carbon atoms, said radicals being saturated, unsaturated, straight or branched alkyl radicals, naphthene radicals, aryl radicals, alkyl aryl radicals or aryl alkyl radicals, and R' can also be a hydrogen atom, the improvement comprising using a mixture of sulphurizing agent and at least one olefinic constituent which is a fatty acid triglyceride and optionally a solvent to introduce the sulphurizing agent into the catalyst.

2. A process according to claim 1, wherein the weight content is said olefinic constituent in the mixture is between 0.1 and 99.9%.

3. A process according to claim 2, wherein said mixture contains 2 to 98% by weight of said olefinic constituent.

4. A process according to claim 1, wherein said mixture contains 4 to 85% by weight of said olefinic constituent.

5. A process according to claim 1, wherein the sulphurizing agent is elemental sulphur.

6. A process according to claim 1, wherein the sulphurizing agent is said compound of formula $R-S_{(n)}-R'$.

7. A process according to claim 1, wherein the sulphurizing agent is a mixture of elemental sulphur and said compound of formula $R-S_{(n)}-R'$.

8. A process according to claim 7, wherein 5% to 75% by weight of sulphur incorporated into the catalytic material results from the incorporation of therein of the compound of formula $R-S_{(n)}-R'$.

9. A process according to claim 1, wherein the solvent boils at above approximately 200° C.

10. A process according to claim 1, wherein the catalyst has a non-acid support.

11. A process according to claim 1, wherein the support is selected from the group consisting of alumina, fluorinated alumina, magnesia, fluorinated silica, silica-alumina, silica-magnesia, aluminaboron, clay, charcoal, a zeolite, and mixtures thereof.

12. A process according to claim 1, wherein the catalyst contains at least one Group VI or VIII metal.

13. A process according to claim 12, wherein the metal is selected from the group consisting of cobalt, molybdenum, nickel, tungsten, platinum, palladium, or and mixtures thereof.

* * * * *